US00RE35650E

United States Patent [19]

Partyka et al.

[11] E Patent Number: Re. 35,650

[45] Reissued Date of Patent: Nov. 4, 1997

[54] SPREAD SPECTRUM COMMUNICATIONS SYSTEM

[75] Inventors: Andrzej Partyka, Bediminster, N.J.; Lee F. Crowley, Farmingville, N.Y.

[73] Assignee: Pitway Corporation, Syosset, N.Y.

[21] Appl. No.: 490,955

[22] Filed: Jun. 15, 1995

Related U.S. Patent Documents

Reissue of:

[64] Patent No.: 5,241,562
Issued: Aug. 31, 1993
Appl. No.: 894,073
Filed: Jun. 5, 1992

U.S. Applications:

[63] Continuation of Ser. No. 589,323, Sep. 27, 1990, Pat. No. 5,121,407.

[51] Int. Cl.[6] ..... H04L 27/30

[52] U.S. Cl. ..... 375/206; 375/344; 380/34

[58] Field of Search ..... 375/200–210, 375/271, 337; 380/34, 46; 370/18, 91

[56] References Cited

U.S. PATENT DOCUMENTS

| | | | |
|---|---|---|---|
| 2,341,649 | 2/1944 | Peterson | 375/334 |
| 2,354,827 | 8/1944 | Peterson | 375/334 |
| 2,539,797 | 1/1951 | Smith | 375/337 X |
| 2,624,834 | 1/1953 | Atwood | 375/334 |
| 2,636,115 | 4/1953 | Peterson et al. | 375/334 |
| 3,164,773 | 1/1965 | Daniel | 375/334 X |
| 3,728,529 | 4/1973 | Kartchner et al. | 380/46 X |
| 3,761,817 | 9/1973 | Kaltschmidt et al. | 375/271 |
| 3,805,192 | 4/1974 | Ocnaschek et al. | 332/127 |
| 3,947,769 | 3/1976 | Rousos et al. | 370/91 |
| 3,953,798 | 4/1976 | Sjostrand et al. | 375/267 |
| 4,206,462 | 6/1980 | Rabow et al. | 342/60 |
| 4,355,399 | 10/1982 | Timor | 375/202 |
| 4,583,231 | 4/1986 | Puckette | 375/202 |
| 4,774,715 | 9/1988 | Messenger | 375/1 |
| 5,121,407 | 6/1992 | Partyka et al. | 375/1 |

FOREIGN PATENT DOCUMENTS

| | | | |
|---|---|---|---|
| 0131458 | 1/1985 | European Pat. Off. | H04B 1/66 |
| 0199410 | 10/1986 | European Pat. Off. | H04K 1/00 |
| 2450727 | 11/1979 | German Dem. Rep. | H04K 3/00 |

OTHER PUBLICATIONS

J. Fischer et al, "Wide-Band Packet Radio for Muiltipath Environments"; *IEEE Trans. on Comms.*; vol. 36, No. 5; May 1988; pp. 564–576.

A. Saleh et al, "A Statistical Model for Indoor Multipath Propagation"; IEEE Journ. on Selected Areas in Comms.; vol. SAC-5, No. 2; Feb. 1987; pp. 128–137.

S. Patsiokas et al, "Propagation of Radio Signals Inside Buildings At 150, 450, and 850 MHz"; IEEE, 1986.

R. Murray et al, "815 MHz Radio Attenuation Measured Within a Commercial Building"; IEEE, 1986, pp. 209–212.

(List continued on next page.)

*Primary Examiner*—Bernarr E. Gregory
*Attorney, Agent, or Firm*—Ladas & Parry

[57] ABSTRACT

A spread spectrum communication system for direct sequence transmission of digital information having a modulation format which is particularly suitable for indoor communication within residential, office and industrial structures. The modulation format combines BPSK or MSK spreading with FM carrier modulation by data bits and a carrier frequency shift whose magnitude is related to both a chip rate and a spreading sequence length. The carrier, chip clock and data clock are all synchronous and the sequence length is an integral submultiple of the bit length. The system reduces the frequency error between the transmitter chip clock and the receiver chip clock to permit the elimination of a code phase tracking loop in the receiver to reduce the receiver complexity. The receiver has an extended dynamic range which makes possible the reception of very strong signal without an automatic gain control loop (AGC) as well as reducing the time needed for code phase acquisition. The transmission system is highly resistant to CW jamming and short distance multipath effects.

23 Claims, 9 Drawing Sheets

OTHER PUBLICATIONS

S. Alexander, "Characterizing Building for Propagation at 900 MHZ"; Electronics Letters; Sep. 29, 1983; vol. 19, No. 2; p. 860.

D. Devasirvatham, "A Comparison of Time Delay Spread and Signal Level Measurements within Two Dissimilar Office Buildings"; IEEE Trans. on Antis and Prop.; vol. AP-35; No. 3; Mar. 1987; pp. 319–324.

S. Alexander, "Radio Propagation Within Buildings at 900 MHz"; Electronics Letters; Oct. 14, 1982; vol. 18, No. 21; pp. 913–914.

Jee Journal of Electronic Engineering, vol. 25, No. 25, Jul. 1988, Tokyo JP "Weak Signal Transceiver Uses Asynchronous Spread Spectrum Communication Method", pp. 102–104.

Tc 0
180
0
180
0
180
A
2A
810
820
830
840
$T_D \ell \ll T_C$
880
f
100MHz

SPREAD SPECTRUM COMMUNICATIONS SYSTEM

Matter enclosed in heavy brackets [ ] appears in the original patent but forms no part of this reissue specification; matter printed in italics indicates the additions made by reissue.

This is a continuation of copending application(s) Ser. No. 07/589,323 filed on Sep. 27, 1990 (now U.S. Pat. No. 5,121,407 issued Jun. 9, 1992).

The present invention relates to a method and apparatus for the transmission of digital data in a spread spectrum communications system. In particular, it relates to a spread spectrum communication system for use in transmitting alarm data within a building or other structure which can contain sources of electromagnetic interference and in which there is a potential for short distance multipath cancellation effects.

Techniques for achieving direct sequence spread spectrum modulation are well known The most commonly accepted method involves generating a periodical, relatively high frequency, repetitive pseudo-noise code (PN code) and effectively mixing the data signal with this PN code using exclusive OR gates or a balanced mixer. The resulting signal is characterized by very wide bandwidth and very low spectral density. The direct sequence spread spectrum modulation is particularly attractive for data transmission within a building (compared to narrow band radio frequency carriers) in that the low spectral density characteristic of such signals reduces the tendency for interference with other radio sensitive equipment. Also, spread spectrum techniques have the intrinsic ability to reduce interference between multiply reflected versions of the transmitted signal, since reflections which differ in phase only slightly from the initial signal being decoded result in low signal correlation and consequent suppression of such signals. In a similar manner, the same spread spectrum techniques can be used to suppress other jamming signals which may be present in the medium and interfere with the received signal.

It is further well known that communications within buildings or other structures can cause substantial attenuation of the original signal. Consequently, a receiver for such systems must have a wide dynamic range in order to be able to acquire weak signals as well as strong signals, particularly if the communication is to be performed at random between a plurality of transmitters and receivers.

Both the jamming and multipath phenomena for direct sequence spread spectrum techniques have been discussed in papers and textbooks and patent documents. However, most of these have restricted the scope of their attention to cases where the signals are introduced deliberately into the medium and intelligently controlled to cause the most harm. This results in the objective being to determine the method most immune to the interference under worst case conditions. It is has also usually been tacitly assumed that the data mixing with the PN code and modulating the radio frequency carrier should result in a modulated waveform which will not permit demodulation of the data without prior synchronization and correlation to the same PN code used for the original modulation. This results in some restriction being placed on the way the data, PN code and carrier are combined to convey the information, as well as restrictions being placed on the relationship between the data rate and the sequence repetition rate.

The multipath delay is usually considered to be relatively long. That is, the delay between the original data and the delayed replica is assumed to be much longer than one chip time. The mechanisms devised to deal with this multipath problem are different than those needed to suppress so called "selective fading" caused by electromagnetic field cancellation which occurs when the original signal and the delayed replica arrive at the receiver in opposite phase. This occurs in the case where the delay is approximately (2*k+1)*wvl/2, where k is an integer and wvl is the carrier wavelength where both the original and the replica have approximately the same amplitude. However, it has been suggested in the scientific literature that short delays are one of the most important factors to consider for indoor communications.

The above-delineated restrictions are a natural consequence of the major original applications of spread spectrum communications, that is, military applications in generally hostile communications environment in which jammers are intelligent and active and communication is attempted over distances much larger than building interiors. Furthermore, in these cases, a major concern is a need to hide or at least provide a low probability of detection of the attempted communication by enemy eavesdroppers.

Only recently has the Federal Communications Commission (FCC) permitted the utilization of spread spectrum communications techniques for commercial applications. The FCC has now permitted such operations in three separate frequency bands. Thus, there is a need for a spread spectrum communications system which addresses the needs of commercial applications and which are not restricted by the needs of military applications.

SUMMARY OF THE INVENTION

It is the general object of the present invention to provide an improved method and apparatus for transmitting spread spectrum signals.

Another object of the invention is to provide a method and apparatus for transmitting spread spectrum signals which has jamming rejection substantially better than expected for a given spreading sequence length.

A further object of the invention is to provide a method and apparatus for transmitting spread spectrum signals in which short distance multipath cancellation of the type encountered in residential and office buildings is eliminated or substantially reduced.

Yet another object of the present invention is to provide a method and apparatus for transmitting spread spectrum signals in which there is a reduction of the frequency error between the transmitter chip clock and the receiver chip clock which permits the elimination of a code phase tracking loop in the receiver, which in turn substantially reduces receiver complexity.

A further object of the present invention is to provide a method and apparatus for transmission of spread spectrum signals in which there is an extension of the dynamic range of the receiver which makes possible the reception of very strong signals without an automatic gain control loop (AGC) while at the same time reducing the time needed for code phase acquisition.

Another object of the present invention is to provide a method and apparatus for transmitting spread spectrum signals that provide the receiver with immunity from interference from CW signals generated by personal computer crystal oscillators or the like.

Another object of the invention is to provide a method and apparatus for transmitting spread spectrum signals in which data, chip clock and carrier are synchronous.

A further object of the present invention is to provide a method and apparatus for transmitting spread spectrum signals in which the bit period length (Tb) is N (where N is an integer greater than 1) times longer than the pseudo noise (PN) sequence period (Ts) which results in a modified spectrum of the spread signal and consequently the spectrum of the jammer being spread by the receiver's despreading mixture.

Yet another object of the present invention is to provide a method and apparatus for transmitting spread spectrum signals in which the transmitter center frequency is frequency modulated at a data rate with a low deviation and in addition is frequency shifted at a lower rate by a large increment relative to the chip rate and sequence length and in which the same data packet consisting of a preamble and data is repeated after each frequency shift.

A further object of the present invention is to provide a method and apparatus for transmitting spread spectrum signals in which the data packet consists of a preamble and data following the preamble, the preamble being longer than the data and comprising a period in which the carrier is not modulated and the data comprising a period in which data bits modulate the carrier center frequency.

A still further object of the present invention is to provide a method and apparatus for transmitting spread spectrum signals in which the modulated carrier is then spread to the desired transmission bandwidth by applying a PN code sequence to a balanced mixer or other device to obtain BPSK spreading.

Yet another object of the invention is to provide a receiver for receiving a spread spectrum signal in which the resultant IF spectral components of a CW jamming waveform present in the RF section of the receiver are separated in frequency by an amount larger than the bandwidth occupied by the desired despread signal.

A still further object of the present invention is to provide a method and apparatus for transmitting a spread spectrum signal in which a single CW jammer can produce at most only one spectral component of the spread jammer present in the passband of the narrow band FM receiver following the despreading mixer.

These and other objects, advantages and features are achieved by a method of transmitting digital data. A high frequency carrier is generated at a carrier frequency. The frequency of said carrier is modulated by data bits assembled in data packets of predetermined format. Modulating the frequency of said second carrier frequency by data bits assembled in data packets of said predetermined format. The carrier is spread during a transmission time, by a predetermined PN sequence having a period Ts related to a bit time Tb, where Tb=N * Ts, N being an integer>1. This generates a spread carrier spectrum comprising many spectral components separated by 1/Ts in which the amplitudes of said components are reduced by the spreading function. Components and the modulation imposed upon them are separable from other components by a narrow band filter having a bandwidth less than 1/(2*Ts).

Another aspect of the invention includes a transmitter for transmitting digital data. A carrier frequency generator means generates a carrier frequency signal. A pseudo random sequence generator means generates a predetermined PN sequence. A carrier spread means spreads power of carrier frequency by said pseudo noise sequence where the spread carrier generates spectral components separated by a frequency interval greater than 1/Ts where Ts is a pseudo noise (PN) sequence period.

A further aspect of the invention includes a receiver for a spread spectrum signal. A means for receiving a spread carrier radio signal generates a spread carrier electrical signal. A means generates a predetermined pseudo noise sequence (PN sequence)combined with a local oscillator signal. A multiplying means coupled to said receiving means and to said generating means multiplies said spread carrier electrical signal by said predetermined PN sequence for collapsing the bandwidth of the received spread carrier when the local PN sequence phase is in agreement with the sequence phase imposed on the received spread carrier by a transmitter means. This spreads any jamming signals which are received along with the transmitted spread signal into many components separated by 1/Ts intervals and reduces their amplitude by the spreading function. A narrow band FM receiver means having a bandwidth less than 1/(2*Ts) coupled to an output of said multiplying means recovers data.

A still further aspect of the invention includes a system for transmitting and receiving digital data. A means generates a high frequency carrier. A means modulates the frequency of said carrier by data bits assembled in data packets of predetermined format. A means spreads said carrier during a transmission time, by a predetermined PN sequence having a period Ts related to a bit time Tb where Tb=N * Ts, N being an integer>1 and Ts being a pseudo noise (PN) sequence period. This generates a spread carrier spectrum comprising many spectral components separated by 1/Ts. The amplitudes of the components are reduced by the spreading function. A means receives the transmitted data. A means multiplies said transmitted spread carrier in a receiver by a locally generated predetermined PN sequence and a local oscillator frequency for collapsing the bandwidth of the received spread carrier when the local PN sequence phase is in agreement with the sequence phase imposed on the received spread carrier.

BRIEF DESCRIPTION OF THE DRAWINGS

FIG. 2a illustrates the power control signal, FIG. 2b illustrates the data signal, FIG. 2c illustrates the divider control signal, FIG. 2d illustrates the crystal oscillator frequency and FIG. 2e illustrates the carrier frequency;

FIG. 3a illustrates the PN sequences, FIG. 3b illustrates the clock pulses from the PN sequence generator, FIG. 3c illustrates the data clock and FIG. 3d illustrates the data bits;

FIG. 4a illustrates the transmitted envelope at time T1, FIG. 4b illustrates the transmitted envelope at time T2, FIG. 4c illustrates the close-in spectra at time T1 and FIG. 4d illustrates the close-in spectra at time T2;

FIG. 6a illustrates the frequency shift signal, FIG. 6b illustrates the frequency of the reference oscillator and FIG. 6c illustrates the frequency of the local oscillator;

FIG. 7a illustrates the spectrum of the signal received at the antenna at time T1, FIG. 7b illustrates the spectrum of the signal received at the antenna at time T2, FIG. 7c illustrates the envelope of the spread jamming signal at time T1, FIG. 7d illustrates the envelope of the spread jamming signal at time T2, FIG. 7e illustrates the close-in spectrum of FIG. 7c and FIG. 7f illustrates the close-in spectrum of FIG. 7d;

FIG. 8a illustrates a PN sequence, FIG. 8b illustrates a spread carrier, FIG. 8c illustrates a delayed spread carrier, FIG. 8d illustrates the despread sum of the carriers of FIG. 8b and 8c, and FIG. 8e illustrates the spectrum of the signal of FIG 8d;

FIG. 9a illustrates the spectrum at time T1, FIG. 9b illustrates the spectrum at time T2, FIG. 9c represents the close-in spectra of FIG. 9a, and FIG. 9d represents the close-in spectra of FIG. 9b.

DETAILED DESCRIPTION

Figure 1:
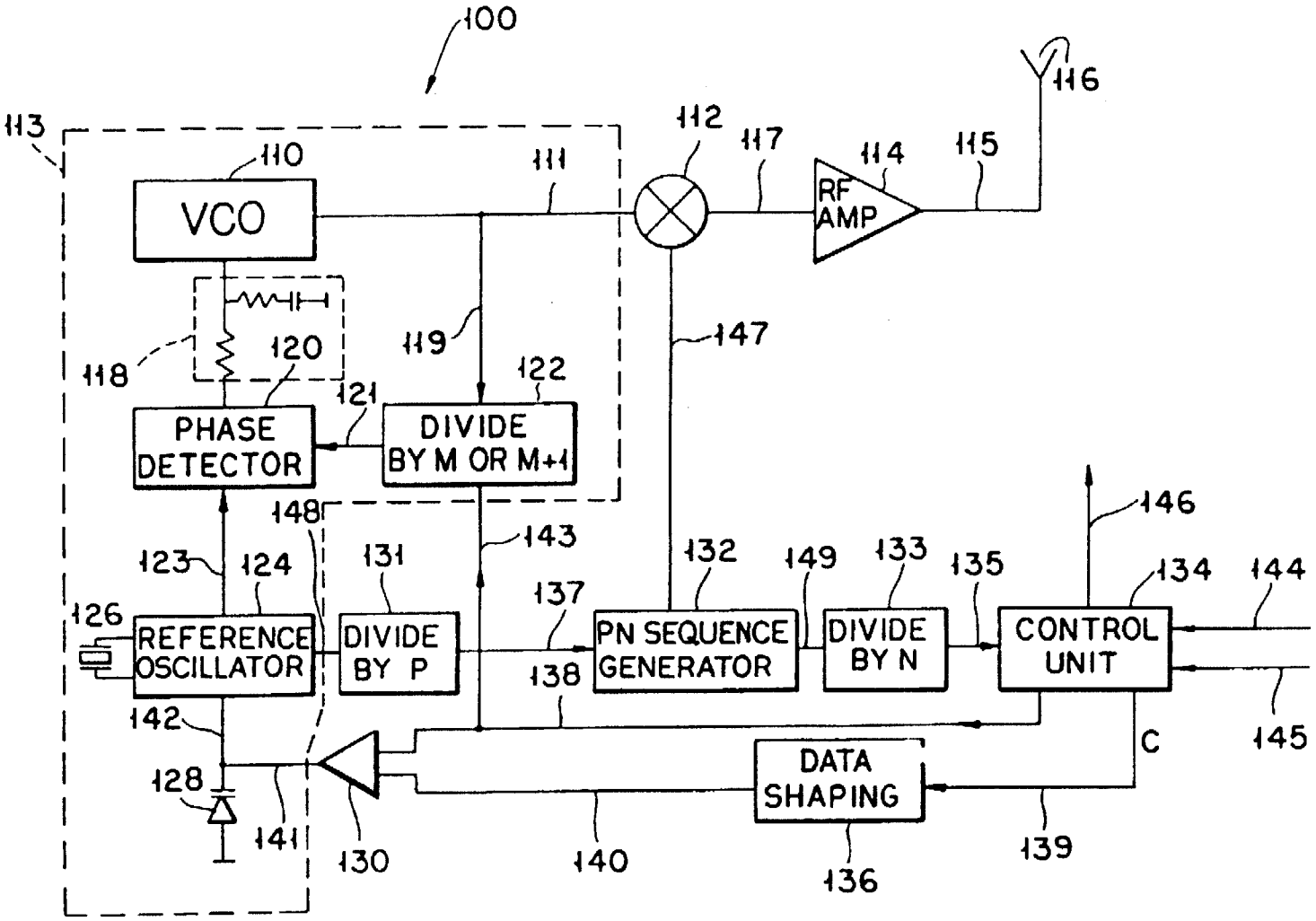
FIG. 1 is a schematic diagram of a transmitter in accordance with the present invention.

A communication system according to the present invention is composed of a transmitter and a receiver. Referring to FIG. 1, the transmitter is generally shown as 100. The high frequency carrier signal is generated in the transmitter 100 by a voltage controlled oscillator (VCO) 110. The voltage controlled oscillator 110 is part of a phase lock loop (PLL) 113 which also comprises divider 122, phase detector 120, loop filter 118 and reference oscillator 124. The output of VCO 110 is coupled to the input of a divider 122 via lines 111 and 119. The output of the divider is coupled to phase detector 120 via line 121. The output of reference oscillator 124 is coupled via line 123 to second input of phase detector 120. The output of the phase detector is coupled through loop filter 118 to the control input of VCO 110. A crystal 126 is coupled to reference oscillator 124 for stabilizing the output thereof. A varactor diode 128 is coupled to reference oscillator 124 via line 142.

Figures 2A, 2B, 2C, 2D, 2E:
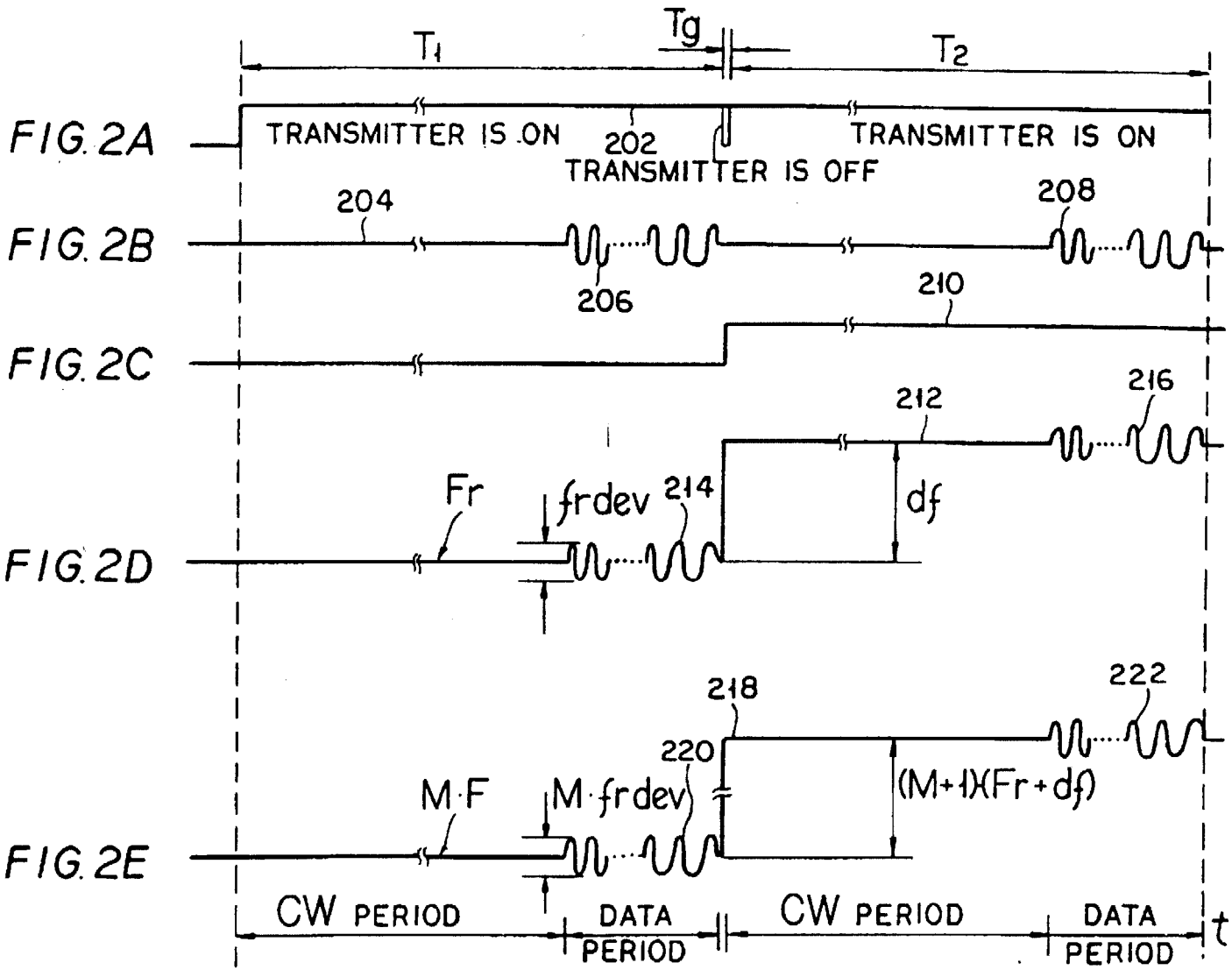
FIGS. 2a–2e are timing diagrams for signals generated within the transmitter of FIG. 1.

The circuitry above described in connection with phase lock loop 113 is well known to those skilled in the art and not need be described in detail. The operation of the circuitry to produce a narrow band FM modulated carrier is also well known and need not be discussed in detail here. The carrier signal produced by the phase lock loop 113 is shown in FIG. 2e and will be described below in connection with that figure.

In one embodiment the phase detector 120 may be a 2 input exclusive OR gate having lines 121 and 123 coupled to the inputs and an output coupled through loop filter 118 to the control input Of VCO 110. Divider 122 may be a dual modulus prescaler integrated circuit such as a Fujitsu MB501. Such dual modulus prescalers provide two selectable divide-by-ratios and are commonly utilized as part of the divider in a PLL circuit in order to preserve the channel spacing. Typically the dual modulus pescaler precedes fully programmable divider circuits to produce a divider capable of operating at VHF and UHF frequencies. The divider 122 of the present invention can comprise only the dual modulus prescaler to provide a considerable cost saving.

The output of the phase lock loop on line 111 is coupled to multiplier 112 which receives a pseudo noise sequence (PN sequence) signal on line 147 from PN sequence generator 132. Multiplier 112 serves as a spread spectrum modulator for modulating the narrow band FM modulated carrier generated by PLL 113 to produce a spread spectrum signal on line 117. The spread spectrum signal on line 117 supplies the input of radio frequency amplifier 114 which generates an amplified signal. The amplified signal is transmitted to the receiver shown in FIG. 5 via antenna 116. The antenna 116 is coupled to the output of the radio frequency amplifier 114 via line 115. The clock utilized to generate the PN sequence is derived from the reference oscillator 124 via divider 131. Divider 131 is coupled to reference oscillator 124 by line 148 and divides the frequency of the frequency oscillator by a predetermined number P. The output of divider 131 is coupled to the PN sequence generator 132 via line 137. Data is applied to control unit 134 on a plurality of lines illustrated as lines 144 and 145. Each of the lines 144, 145 is utilized for a different type of input. For example, in a burglar alarm system for a home, input 145 might represent an alarm condition from an external sensor (not shown). Such external sensor may be a normally open or normally closed switch or an electronic detector applying a voltage on line 145 to indicate an alarm condition. These sensors are well known in the alarm art. Therefore, further discussion is omitted. Line 144 might be utilized to indicate tampering with the transmitter 100. A well known technique is to enclose a normally closed tamper switch in the transmitter housing. Opening the housing opens the switch contacts to activate the transmitter to transmit a tamper signal. Alternately, it is known to use a normally open switch as a tamper switch within the transmitter housing which is closed by opening the housing to transmit a tamper signal. Other possible input signals to the control circuit 134 includes a low battery indicator which would be internal to the transmitter and indicate that the battery for the transmitter requires replacement. A signal would be transmitted to a central unit to advise the operator to replace the battery. The control unit 134 converts the input data into packets according to a predetermined format, which is then output on line 139 in synchronism with a data clock. Data packets in the predetermined format are stored in the control unit 134 for each possible message type. The receipt of one of the possible input signals triggers the control unit 134 to generate the appropriate data packet. The data clock is generated by PN sequence generator 132 via divider 133. The input of divider 133 is coupled to the output of PN sequence generator via line 149. The output of divider 133 is coupled to the data clock input of control unit 134 via line 135. In a preferred embodiment, the PN sequence generator produces a cyclic signal which is a pseudo noise sequence (PN sequence) of period Ts which is supplied to mixer 112 via line 147. In addition, it produces clock pulses on line 135 at the beginning of each sequence. The data clock signal is produced by dividing the clock pulses by a modulo N counter 133 which is then coupled to control unit 134 via line 135. This results in N sequences being generated during one bit and the bits being synchronous with the sequence period. In a preferred embodiment, N is equal to 4 so that 4 sequences are produced during one bit. The data clock and its relationship to the clock pulses and the PN sequence period are shown in FIG. 3 and discussed below. The data packets on line 139 are shaped by data shaping filter 136 to reduce sharp transitions in the digital bit stream which are unsuitable for modulating a carrier. The signal at the output of filter 136 is shown in FIGS. 2b and discussed below in connection with that figure. The output of filter 136 is then applied via line 140 to the input of summation amplifier 130. A divider control signal 138 is generated by control unit 134 on line 138 which controls the operation of divider 122 to divide by a number M or by M+1. This signal is also applied to the second input of summation amplifier 130. The output of summation amplifier on line 141 is the signal Umod which is applied to the varactor diode 128 in order to modulate the narrow band FM carrier generated by PLL 113 in a known manner.

Control unit 134 also generates a power control signal on line 146. In one state, the power control signal disconnects the power from most of the transmitter circuitry to conserve power and to assure that the carrier is transmitted only during two predetermined time periods T1 and T2. This reduces the potential for interference when a plurality of transmitters are used in a system. Accordingly, the power control signal is applied to a means (not shown), such as an electronic switch, in order to control the application of power to the transmitter circuitry.

The operation of transmitter 100 will now be described in connection with FIGS. 2a through 2d. The control unit 134 is responsive to an input signal on lines 144 or 145 to produce a power control signal on line 146. The power control signal determines whether the transmitter is in the ON or OFF state. The signal 202 shown in FIG. 2a has ON periods T1 and T2 at which time the transmitter is in the ON state. Between the ON states T1 and T2 is a short duration OFF state Tg during which time the transmitter is off. After the transmission during period T2, the transmitter is again rendered in the OFF state until the next transmission is to occur. This signal 202 is applied to the electronic switch described above to apply power to the remaining portions of the transmitter during the ON periods. It should be noted that the signals shown in FIGS. 2b–2e are undefined when the transmitter is in the OFF state following T2 or preceding T1.

The time Tg between periods T1 and T2 can be set to zero or in a preferred embodiment it can be a randomly assigned value, which is much larger than T1 or T2. This reduces the probability of losing a packet of data caused by the simultaneous transmission of more than one transmitter, which may occur in an alarm system where a plurality of transmitters are utilized and such transmitters transmit at random.

The preferred format of the data signal is shown in FIG. 2b. The data signal consists of a CW period during which time the signal is set to its nominal value and a data period during which the signal varies according to the data bits of the message. The data bits are preceded by preamble bits and followed by cyclic redundancy check (CRC) bits for message validation. Notice that the edges of the data bit transitions on signal 204 are rounded as shown at 206 and 208 by the data filter 136 in order to be more appropriate for modulating the transmitter without creating many harmonic frequencies. The generation of these harmonics would be detrimental in a system where many transmitters are utilized.

The frequency of the reference oscillator 124 during the CW period is the nominal frequency Fr. During the data period, the frequency of the oscillator is deviated in accordance with the data bits to plus and minus a frequency frdev as shown for signal 212 at 214 and 216 in FIG. 2d. After the data packet has been transmitted a first time, the control unit 134 generates a divider control signal 210 on line 138. This signal is coupled to divider 122 by line 143. The signal 210 is utilized to change the divisor of divider 122 from M to M+1. In addition, the signal is coupled via line 138 to the second input of summation amplifier 130 where it is summed along with the output of data shaping filter 136 on line 140. The addition of the signal 210 in amplifier 130 changes the operating point of varactor diode 128. As shown in FIG. 2d, the frequency of reference oscillator 124 on line 123 is altered by the divider control signal 210 on line 138 to shift the nominal reference frequency by df as shown at 212. Changing the divisor of the divider 122 and changing the operating point of the varactor diode to change the frequency of the reference oscillator 124 combine to produce a carrier frequency which is shown in FIG. 2e. As can be seen from FIG. 2e, the data for the first data packet has a carrier frequency of MFr whereas the data for the second data packet has a frequency of (M+1) (Fr+df) or Fr+(M+1)*df higher than the frequency of the carrier for the first data packet. As stated previously, the transmission of the data twice on two separate frequencies differing by odd multiples of N/2*Ts causes no CW jamming signal spectral components being present in the receiver pass band to corrupt the message on at least one of the two frequencies to guarantee that the message will be properly received. This requires that the loop bandwidth of the PLL is wide enough to accommodate the frequency shifts of the reference oscillator resulting from modulation by the Umod signal.

Figures 3A, 3B, 3C, 3D:
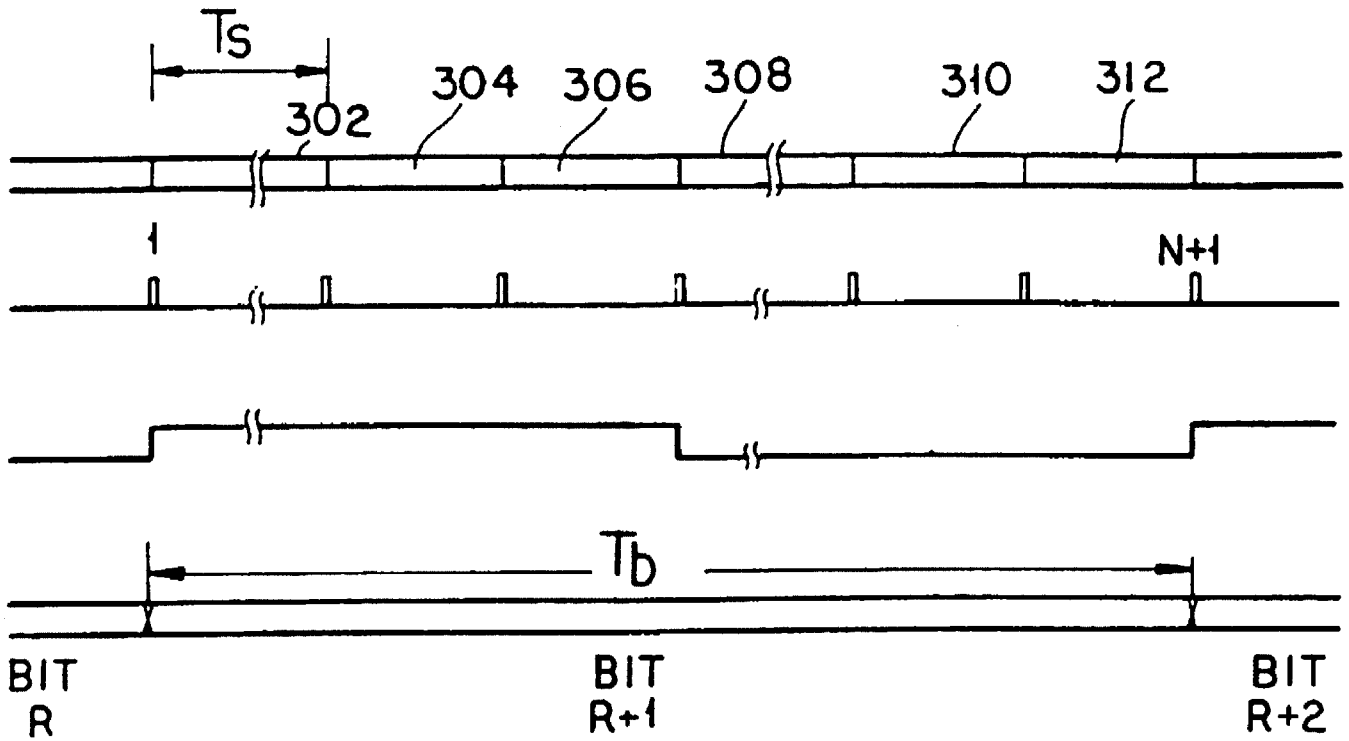
FIGS. 3a–3d are timing diagrams for the data and pseudo-noise (PN) sequence signals of the transmitter of FIG. 1.

FIG. 3 illustrates the timing between the clock pulses on line 137, the data clock pulses on line 135 and the data bits on line 139 and the PN sequences. FIG. 3a shows a series of identical PN sequences 302, 304, 306, 308, 310 and 312. As shown, the period of each PN sequence is designated Ts. FIG. 3b shows the PN generation clock pulses on line 137 and FIG. 3c shows the data clock pulses on line 135. The clock pulses on line 135 are the clock pulses on line 137 divided by N in divider 133. As illustrated, N equal 4. FIG. 3d illustrates the data bits on line 139.

As illustrated, there are multiple PN sequences per data bit. Those skilled in the art recognize that a single PN sequence or other multiple may be utilized.

The signal 218 is applied to mixer 112 in FIG. 1 where it is spread by means of the PN sequence generated by PN sequence generator 132. The output of mixer 112 is the spread spectrum signal on line 117 which is amplified by RF amplifier 114 and then coupled to antenna 116 by line 115.

Figures 4A, 4B, 4C, 4D:
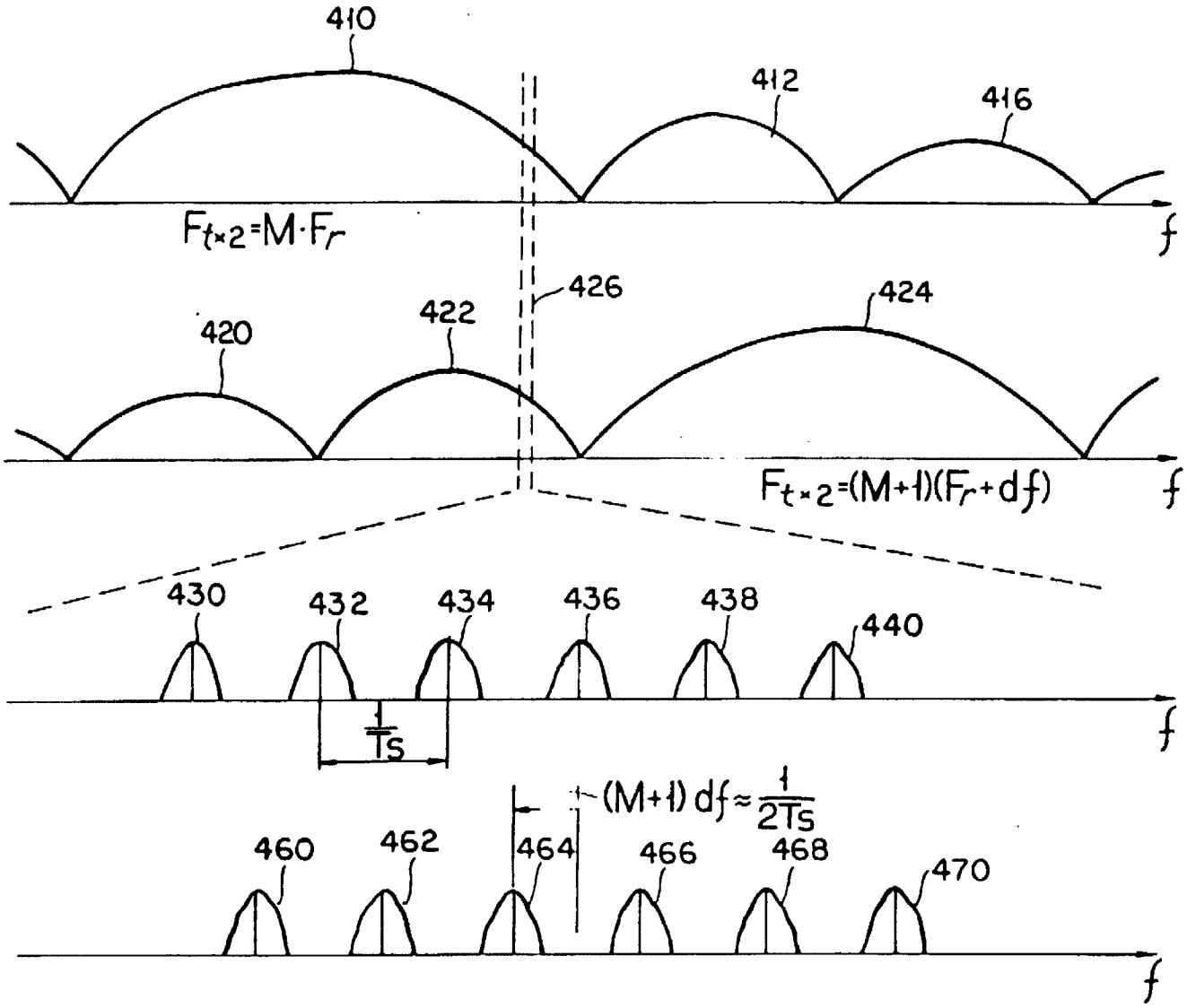
FIGS. 4a–4d illustrate the spectral envelopes and close-in spectra signals transmitted by the transmitter of FIG. 1.

Referring to FIG. 4, the resulting spectrum of the modulated and spread signal, which is time dependent, is shown for appropriately chosen df and M. The power envelope for the spectrum of the first data packet (T1) is shown in FIG. 4a. The envelope shows the typical $(\sin x/x)^2$ reduction in peak power from first lobe 410 to second lobe 412 to third lobe 416. The power envelope for the spectrum of the second data packet (T2) is shown in FIG. 4b. The envelope also shows the typical $(\sin x/x)^2$ reduction in peak power from first lobe 424 to second lobe 422 to third lobe 420. The close-in spectra of the modulated signal for the first data period T1 is shown in FIG. 4c and the close-in spectra for the second data packet during time T2 is shown in FIG. 4d. The lines 426 indicate a specific point in the spectra shown in FIGS. 4a and 4b that are expanded in FIGS. 4c and 4d, respectively.

In FIG. 4c the spectral lines resulting from the spreading of the carrier at time T1 by a PN sequence having a period Ts and being FM modulated by the data signal are shown as 430, 432, 434, 436, 438 and 440. In FIG. 4d the spectral lines resulting from the spreading of the carrier at time T2 by a PN sequence having the period Ts and being FM modulated by the data signal are shown as 460, 462, 464, 466, 468 and 470. Comparing FIGS. 4c and 4d it can be seen that the spectral lines are disjoint, that is, they are offset one from the other by (M+1)df. The M+1 factor is the result of changing the divisor of divider 122 (FIG. 1). The df factor is the result of changing the operating point of the varactor diode 128 by applying the divider control signal on line 138 to the second input of summation amplifier 130 (FIG. 1).

This frequency, offset by one-half the spectral line frequency interval, in the example shown, helps in rejecting interfering signals. Offsets of other than one-half the spectral line frequency interval can be chosen. Assuming a CW interference signal, the interference signal will be subjected to the same PN sequence in the receiver as the desired signal and will thus be converted into a spread spectrum signal. One of the spectral lines produced by this created spread spectrum signal might be within the receiver passband and interfere with the reception of the desired signal. By choosing df appropriately, the total spectrum is shifted so that the spectral line placement during time T2 is approximately centered between the lines of the spectrum occupied during time T1. This guarantees interference free reception during time T1 or T2. This is further explained below in connection with FIGS. 7 and 9.

It should be noted that, for the embodiment shown in FIG. 1, the divider 131 has a ratio P equal to 2, and therefore Fr is equal to 2*Fc, where Fc is the chip rate of PN sequence generator. As is well known to those skilled in the art, in spread spectrum systems, each bit time is subdivided into a plurality of "chips" which determine the bandwidth of the communications channel. The greater the number of "chips" per bit, the greater the bandwidth utilized but the greater the amplitude of the interfering signal has to be to be effective, That is, the amount of immunity from jamming is proportional to the sequence length and the ratio between the chip time (1/chip rate) and the bit time (Tb).

Figure 5:
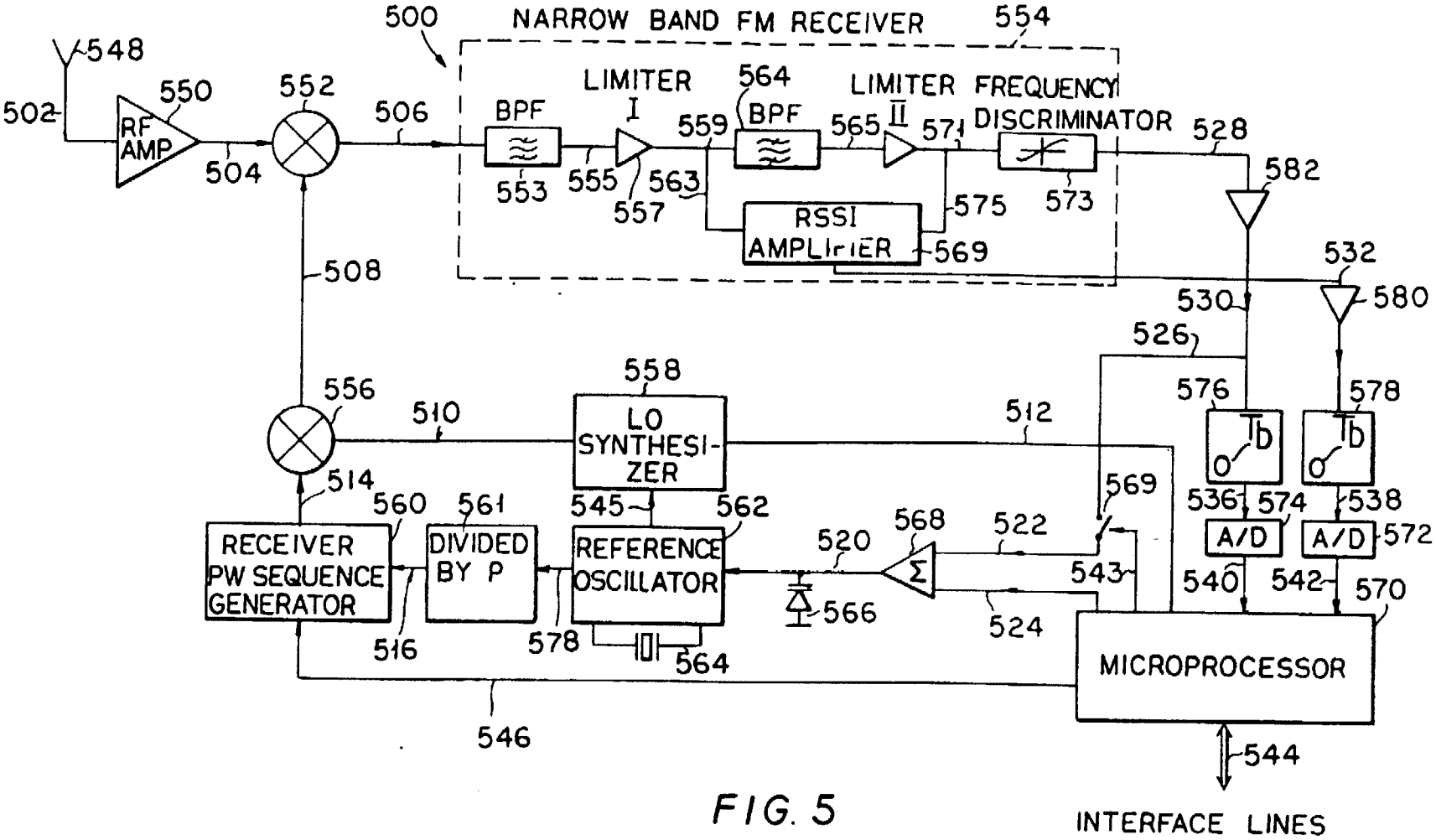
FIG. 5 is a schematic diagram of a receiver for the signals transmitted by the transmitter of FIG. 1.

Referring to FIG. 5, a receiver 500 designed to take advantage of the spectral characteristics of the above-described transmitted signal is shown. The receiver comprises an antenna 548 coupled to a RF amplifier 550 by line 502. The output of RF amplifier 550 is coupled via line 504 to a mixer 552 the output of which is coupled via line 506 to a narrow band FM receiver 554. Narrow band FM receiver comprises a band pass filter 553 receiving the output of mixer 552 via line 506. The output of band pass filter 553 is coupled via line 555 to a first limiter 557. The output of the first limiter 557 is coupled via line 559 to a second band pass filter 564 the output of which is coupled via line 565 to a second limiter 567. The output of the first and second limiters are also coupled via line 563 and 575, respectively, to a receiver signal strength indicator amplifier 569. The output of the second limiter on line 571 is coupled to a frequency discriminator 573. The output of the frequency discriminator on line 528 is coupled to amplifier 582 the output of which is coupled via line 530 to integrate and dump filter 576. The output of receiver signal strength indicator amplifier 569 is coupled via line 532 to amplifier 580. The output of amplifier 580 on line 534 is coupled to integrate and dump filter 578. The outputs of integrate and dump filters 576 and 578 are coupled via lines 536 and 538 to A/D converters 574 and 572, respectively. The outputs of A/D converters 574 and 572 are coupled respectively by lines 540 and 542 to microprocessor 570. Microprocessor 570 generates a signal on line 543 to activate the automatic frequency control (AFC) by closing switch 569 to connect line 526 to line 522. Line 522 is an input to summation amplifier 568. The microprocessor also produces a frequency shift signal on line 524 which is a second input to summation amplifier 568. The output of summation amplifier 568 on line 520 is applied to varactor diode 566 in order to control the frequency of reference oscillator 562. The nominal frequency of reference oscillator 562 is controlled by crystal 564. The reference oscillator outputs a frequency of Fr or Fr+df on lines 545 and 578. Line 545 is an input to local oscillator synthesizer 558 and line 578 is an input to divider 561. Divider 561 divides the frequency of the reference oscillator by a value P, which is identical to that utilized in the transmitter. The output of divider 561 on line 516 is the PN sequence generator clock which is input into the receiver PN sequence generator 560. Receiver PN sequence generator 560 also has an input on line 546 which are signals generated by microprocessor 570 to control the phase of the PN sequence generator. The local oscillator synthesizer 558 is coupled via line 512 to the microprocessor 570 to receive synthesizer control signals. The output of the local oscillator synthesizer at a frequency Flo is applied via line 510 to the input of multiplier (mixer) 556. A second input to multiplier 556 is the output of the receiver PN sequence generator 560 on line 514. The output of multiplier 556 is a spread local oscillator signal on line 508 which is applied as an input to mixer 552. Microprocessor 570 is coupled via interface lines 544 to displays and controls for the system (not shown).

The operation of the receiver will now be described in connection with FIG. 5. The signal received from the antenna 548 is coupled via line 502 to RF amplifier 550 in which it is amplified and applied to mixer 552 via line 504. This signal is multiplied by the spread local oscillator signal containing the locally generated PN sequence in multiplier 552. The PN sequence utilized is identical to the one utilized by the transmitter to spread the signal before transmission. When the phase of the PN sequence generated by the receiver PN sequence generator 560 is aligned with a phase of the sequence which is modulating the received signal, the received signal collapses to a narrow band FM modulated signal (reconstituted carrier centered at the IF frequency) which can be amplified and demodulated by the narrow band FM receiver 554. The phase of the PN sequence is controlled by the phase control signals generated by microprocessor 570 and applied to the receiver PN sequence generator 560 via line 546. The microprocessor adjusts the phase of the receiver PN sequence generator 560 to obtain the maximum carrier power at the output of the limiting amplifiers of the narrow band FM receiver 554.

In a preferred embodiment of the receiver, the microprocessor 570 first scans all possible code phases and determines the corresponding carrier powers. The carrier power is determined through the receiver signal strength indicator which produces a signal indicative of the carrier power. This signal is coupled via line 532 to amplifier 580. The signal is amplified and applied to integrate and dump filter 578, the output of which is converted by the A/D converter 572 into a digital signal which is applied via line 542 to an input of microprocessor 570.

The receiver utilizes a sliding correlator as is well known in the art. It is assumed that the first sequence is being transmitted. The power of the incoming waveform is determined for one sequence and this value is stored in the microprocessor 570. The microprocessor then changes the phase of the generated PN sequence by one chip and repeats the process. This is repeated for all possible sequence phases (equal to the number of chips per sequence). The microprocessor then chooses the phase corresponding to the strongest carrier power. Optionally, the microprocessor can move the phase ±½ chip to maximize the output for the exact phase.

The microprocessor 570 determines the optimum value of the PN generator phase in accordance with a the above described algorithm and then sets the phase of the PN generator via a signal on line 546. At this time, the microprocessor generates a signal on line 543 which closes switch 569 to activate the AFC circuit. The AFC circuit adjusts the frequency of the reference oscillator 562 to obtain a despread signal whose nominal frequency is ideally the IF frequency Fif on line 506. That is, once the PN sequence generators in the receiver and transmitter are in phase, the carrier frequency produced at the output of mixer 552 may not be exactly aligned with the IF frequency of the narrow band FM receiver. The AFC circuit is utilized to align the receiver frequency with the transmitted frequency so that the resultant frequency at the mixer output is the chosen IF frequency, in a known manner. The AFC circuit is disabled until the microprocessor recognizes a valid signal.

The frequency of the local oscillator synthesizer 558 and the PN sequence generator clock on line 516 are both derived from the same reference frequency oscillator 562, having a nominal frequency of Fr. Therefore, the clock frequency of the receiver PN sequence generator 560 approaches the clock frequency of the transmitter PN sequence generator 132 at the end of AFC acquisition process when the signal on line 506 approaches the nominal value Fif. If the transmission time T1 or T2 is appropriately chosen to be short enough, the drift of the receiver and transmitter will be small. This eliminates the need for tracking circuitry to insure that the phase of the receiver PN sequence generator is maintained with respect to the phase of the received signal for the duration of the transmission time, which substantially reduces the complexity of the receiver without significant impact on the receiver's performance.

Figure 6A:
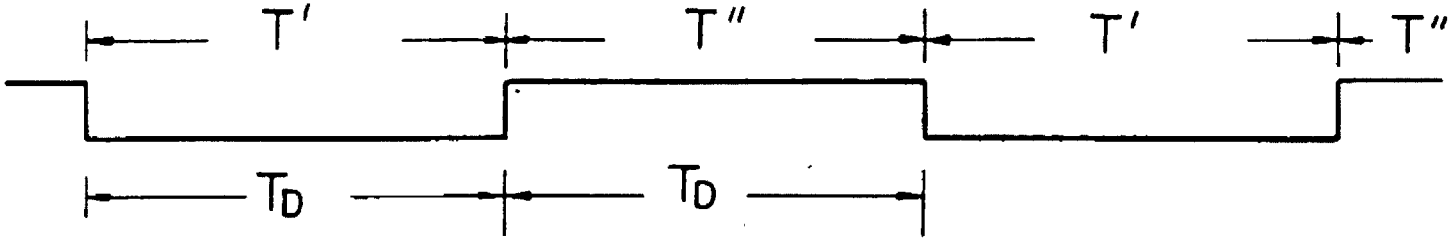
FIGS. 6a–6c are timing diagrams for signals generated within the receiver of FIG. 5.
Figure 6B:
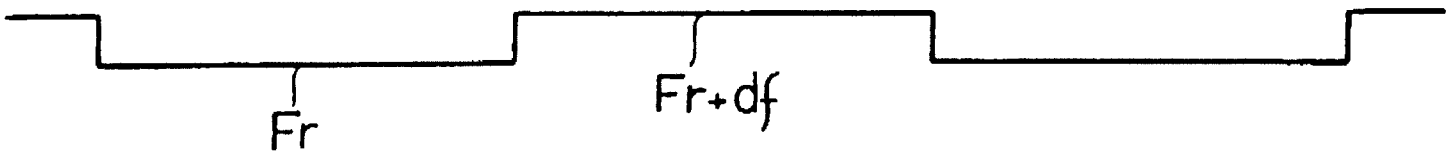
Figure 6C:
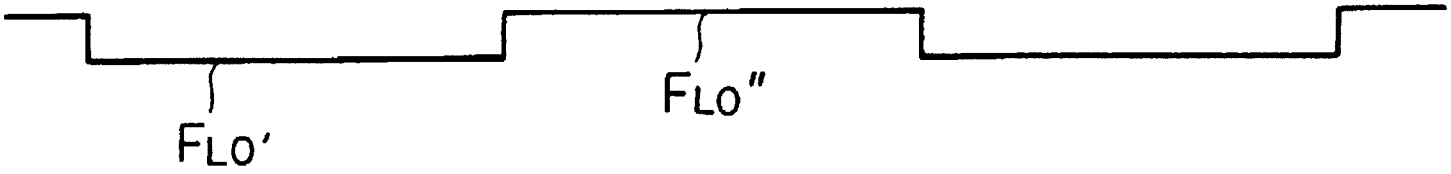

In order to accommodate the signals at both transmitter frequencies, the frequency of the local oscillator synthesizer 558 is switched periodically between two frequencies F101 which is equal to Ft×1-Fif and a frequency F102 which is equal to a frequency Ft×2-Fif where Ft×1 is equal M*Fr and Ft×2 is equal to (M+1)* (Fr+df). The term df is the transmitter increment of the reference oscillator 124 in the transmitter. The processor obtains this value in two steps. First, the processor changes the nominal value of the reference oscillator 562 by applying a frequency shift signal on line 524 input to summation amplifier 568. This changes the voltage on the varactor diode 566 by an amount needed to change the frequency from Fr to Fr+df. Second the microprocessor 570 controls the frequency of the synthesizer 558 via the synthesizer control signal on line 512 to obtain the proper value for FlO. The rate of the switching of the transmission periods T1 and T2 are chosen so that the PN code acquisition can be obtained on both frequencies under the worst timing conditions. The sliding correlator requires enough time to examine each chip phase for each possible chip sequence. This requires a time equal to the square of the number of chips times the chip time. For example, if we utilized 32 chips per sequence, the minimum time required would be $(32)^2$Tc. In a preferred configuration, the CW period during time T1 and time T2 should be approximately [6*L*Tb*Dc] *6*Ls*Tb*Dc* where [L] *Ls* is the sequence length, Tb is the bit time and Dc is a designer choice constant which is usually 1 or 2. The receiver dwell time Td on one frequency has in the preferred embodiment a time of [2*L*Tb*Dc] *2*Ls*Tb*Dc*. The receiver frequency shift signal, the frequency of the reference oscillator and the frequency of the local oscillator are shown in FIG. 6. FIG. 6a represents the frequency shift signal generated by microprocessor 570 and input to summation amplifier 568 via line 524. The time Td is the receiver dwell time in the search mode, which has been described above. During time T' the reference oscillator output shown in FIG. 6b is at a frequency Fr. During a time T" the frequency of the reference oscillator is at a frequency Fr+df. The frequency of the local oscillator synthesizer is shown in FIG. 6c. During the time T' it is at frequency of Ft×1-Fif and during the period T" it is at a frequency Ft×2-Fif.

Upon PN code acquisition the signal on line 506 (FIG. 5) consists of the despread, narrow band FM modulated signal and potentially a spread jamming signal whose spectral components are spaced by 1/Ts, where Ts is the spreading sequence period. The exact placement of the spectral components of the spread jamming signal with respect to the desired signal is determined by the jamming frequency prior to spreading.

Figures 7A, 7B, 7C, 7D, 7E, 7F:
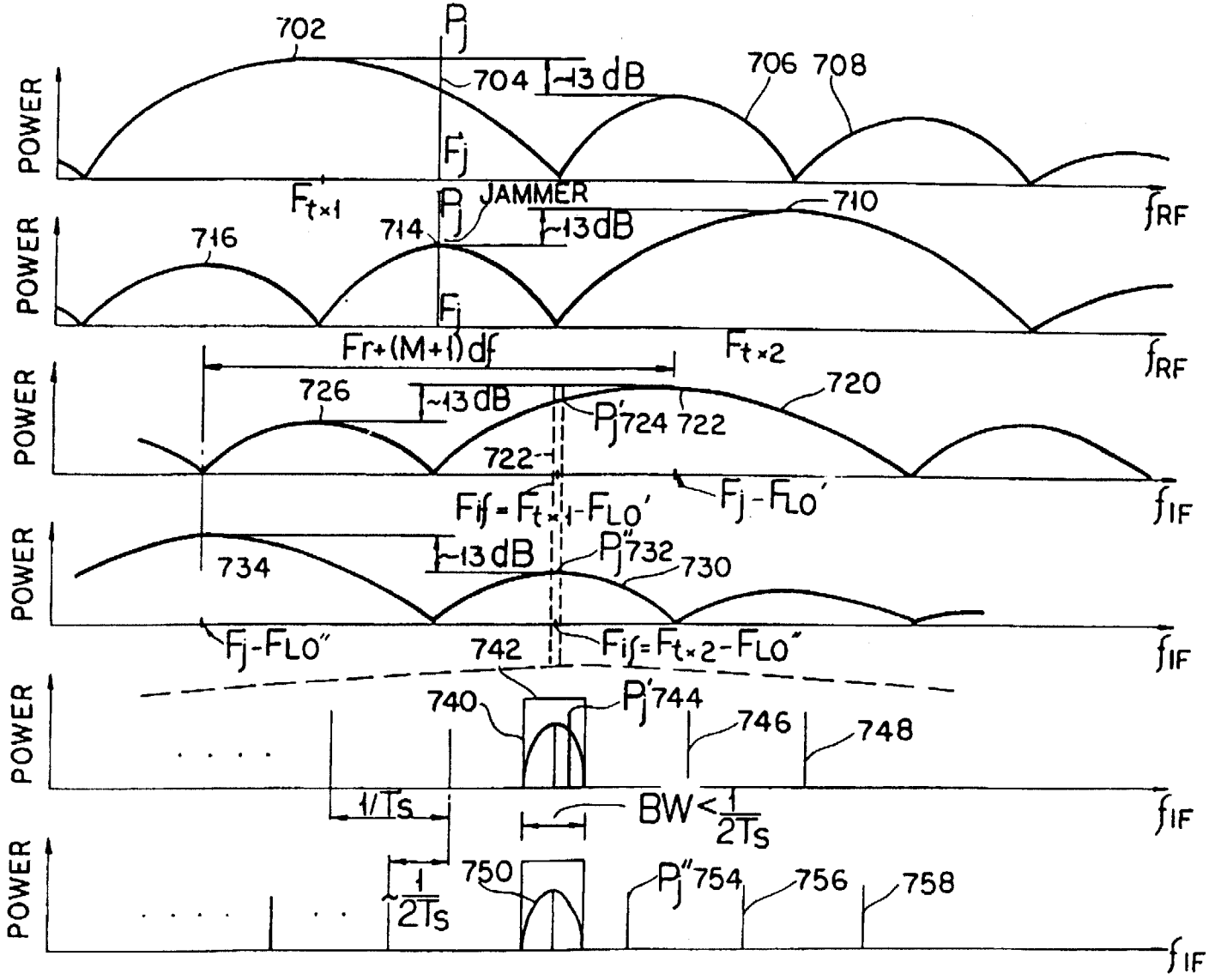
FIGS. 7a–7f illustrate the spectra of the received signals of the receiver of FIG. 5.

FIGS. 7a and 7b show the spectrum of the signal received at the receiver antenna during time T1 and T2 with a jamming signal present in the spectrum. The signal 702 in FIG. 7a is the signal transmitted during time T1. The signal 704 is the jammer at a power level of $P_j$ and a frequency of $F_j$. The typical $(\sin x/x)^2$ envelope produced by modulating rectangular pulses is shown by the attenuation between lobes 702, 706 and 708. The $(\sin x/x)^2$ characteristic causes lobe 706 to be 13 dB lower than the desired signal lobe 702. Lobe 708 is lower than lobe 706 in accordance with the $(\sin x/x)^2$ rolloff. In FIG. 7b, 710 represents the signal transmitted during time T2. Reference numeral 712 represents the jammer at a frequency $F_j'$ and a power $P_j'$. Reference numerals 714 and 716 represent the $(\sin x/x)^2$ envelope. Similarly to FIG. 7a, lobe 714 is 13 dB lower than lobe 710 and lobe 716 is lower than lobe 714 in accordance with the $(\sin x/x)^2$ rolloff. FIGS. 7c and 7d illustrate the envelope of the spread jamming signal after conversion at the output of mixer 552 (FIG. 5) during time T1 and T2. As is well known to those skilled in the art, when a CW signal is passed through a mixer of a spread spectrum receiver, it is acted on similarly to the signal passing through multiplier 112 of the transmitter (FIG. 1). That is, the signal is spread by the PN sequence. This produces the spectrum shown in FIGS. 7c–7f. In FIG. 7c, reference numeral 720 represents the jammer envelope after the mixer 552 during the time T'. Reference numeral 722 represents the peak power of the jammer signal in db as $P_j'$−10LogL and 724 represents the power $P_j$. In FIG. 7d, 730 represents the jammer envelope after the mixer 552 during the time T". Reference numeral 732 represents the power $P_j''$ and reference numeral 734 is the power $P_j$−10LogL.

FIGS. 7e and 7f show the close-in spectrum of the spread jamming signal at the output of mixer 552 (FIG. 5) during time T1 and T2 at points 724 ($P_j'$) and 732 ($P_j''$) and also the relationship of the jamming signal component to the despread desired signal and the receiver IF bandwidth. The spectrum shown in FIGS. 7e and 7f is an expansion of the points in FIGS. 7c and 7d along line 728. In FIG. 7e, 740 represents the despread received signal and 742 represents the bandwidth of the IF band pass filter. Reference numeral 744 represents the jammer at power $P_j'$ 746 and 748 represent the close spectrum jammer components during time T'. In FIG. 7f, reference numeral 750 represents the despread received signal. Reference numeral 752 represents the bandwidth of the IF band pass filter. Reference numeral 754 represents the jammer signal at a power $P_j''$ and reference numeral 756 and 758 represent the close-in spectrum of the jammer components during time T".

The jamming signal envelope, during the time T1, is centered around the frequency $F_j$-Flo' where Flo' is the local oscillator frequency during time T1, which is above the Fif by approximately $F_j$-Ftx1, where $F_j$ is the jammer frequency and Ftx1 is the center frequency of the signal transmitted at time T1. Similarly, the jamming signal envelope during the time T2 is centered around $F_j$-Flo" where Flo" is the local oscillator frequency at time T2, which is below Fif by approximately Ft×2-$F_j$, where Ft×2 is the center frequency of the signal transmitted at time T2. This is due to the frequency conversion in the mixer 552 based on changing the frequency of the local oscillator. Because of the $(\sin x/x)^2$ shape of the envelope, the power level at $P_j''$ (which is in the second lobe) is approximately 10 dB lower than the power level at $P_j'$, where $P_j'$ and $P_j''$ are the jamming signal spectral component power level translated to the IF frequency during times T1 and T2, respectively.

The drawings illustrate that if the despread signal spectrum is narrow enough so that the receiver bandwidth is less than 1/(2*Ts) and the frequency difference between Ft×1 and Ft×2 is equal to Fr plus approximately 1/(2Ts) then at least one reception, that is, Ft×1 or Ft×2, is not corrupted by the jamming signal interference. This is because a narrow-bandwidth receiver filter is effectively between the spectral lines of the spectrum jamming signal. Furthermore, the jamming spectral lines are down by the spreading factor plus an additional factor related to the spread jamming signals $(\sin x/x)^2$ spectral envelope. This can be seen in FIGS. 7e and 7f at $P_j'$ which is in the passband whereas $P_j''$ is not.

As a result, the frequency shift technique is effective in suppressing the non-intentional CW jamming signals, such as those created by computers, terminals, and other devices employing crystal based or other frequency determining elements as part of clock timing circuits. Some gain is also obtained in the suppression of narrow band as well as wide band modulated jamming signals due to the spreading factor and result in the $(\sin x/x)^2$ envelope of the spread jamming signal caused by the correlating mixer.

Figures 8A, 8B, 8C, 8D, 8E:
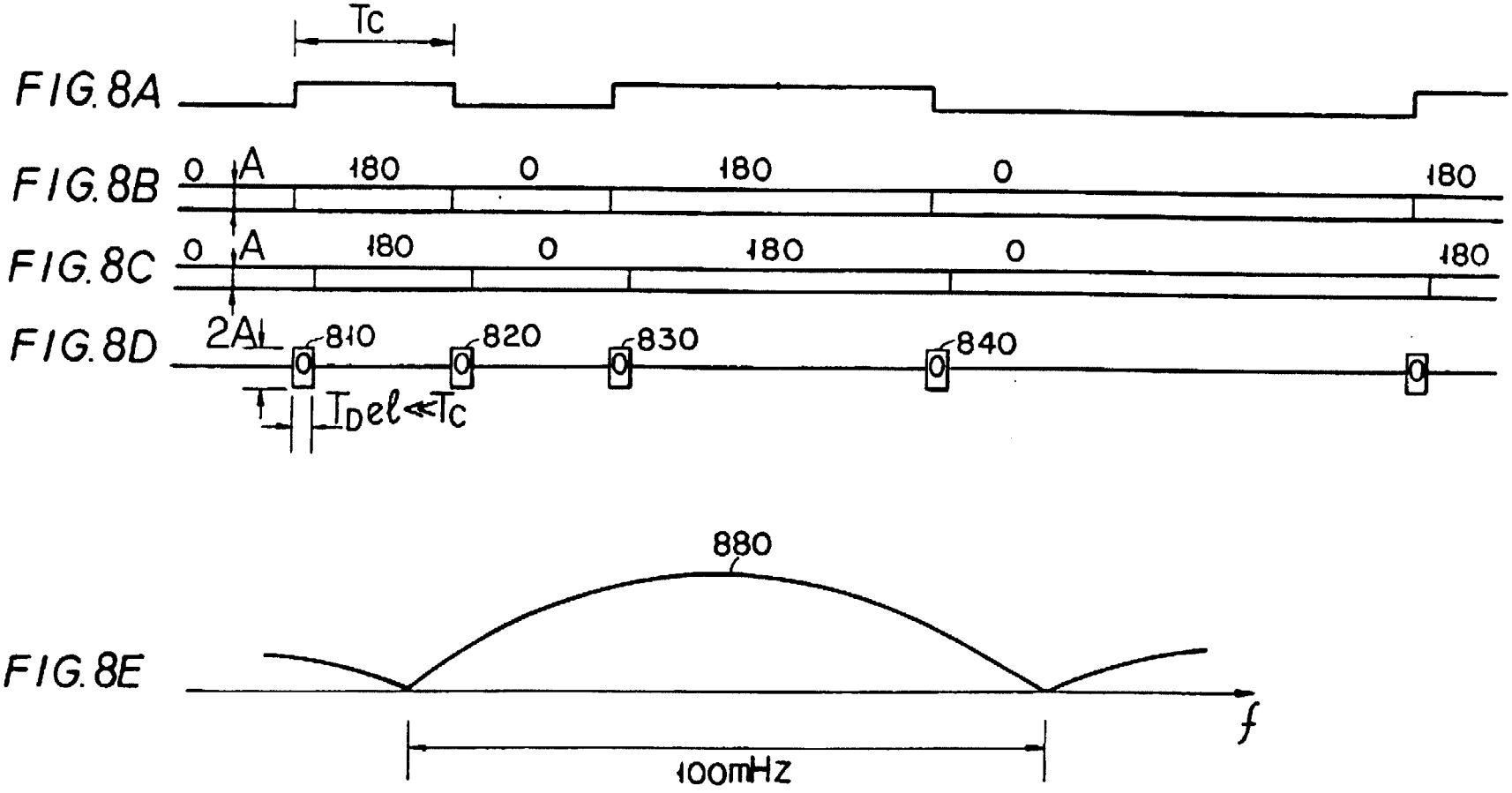
FIGS. 8a–8e illustrate the short multipath effect in the spread spectrum system.

The frequency shift technique described above is also an effective means of suppressing short delay multipath signals frequently encountered when a high frequency carrier is used to communicate inside of buildings. The present invention provides good results for both long delay and, more importantly, for short delay multipath effects in a spread spectrum communication system in which the delays are much shorter than the chip time. Traditional methods are less effective on this type of multipath delay. FIG. 8 illustrates the short multipath effect on the spread spectrum signal FIG. 8a represents a PN sequence having a chip time of Tc. FIG. 8b represents a spread carrier and FIG. 8c represents a delayed spread carrier. FIG. 8d represents the sum of an original and a delayed signal assuming that the power of the time-delayed signal is comparable to the power of the original signal and that the delay is such that the two signals are in opposite phase at the receiver antenna. FIG. 8e represents the spectrum of the resultant signal of FIG. 8d. If the power of the spread carrier and the delayed spread carrier is each A, then the power of the signal in FIG. 8d is 2A as shown at 810. In FIG. 8d the bulk of the signal has been cancelled since the signals only add during chip transitions and then only for the duration of the time delay $T_{Del}$ is shown in 810, 820, 830, 840 and 850. The resultant power of the signal shown in FIG. 8d is much smaller than the power of the original signal. If the power that would be available is $P_{TOT}$, then the power available at 830 or 840, for example, is $$P_{TOT} = \frac{P_{TOT}}{\frac{T_c}{2*T_{Del}}}$$

where $T_{Del}$ is the delay time between the signals of FIGS. 8b and 8c. In a practical example for a chip rate of 5 million chips per second and a time delay of 20 nanoseconds, the power of the signal shown in FIG. 8d is 5 times smaller than the power of the original signal. In addition, the spectrum of the resultant signal is much wider, as shown in FIG. 8e and therefore only a part of the total power of the signal can pass through the narrow band receiver filters. In the example discussed above, only one tenth of the energy originally present is available in the detector. Thus, the total loss of power, considering the above-described loss of 80% of the original power, is therefore approximately 50 times or 17 dB is shown at 880. The power at this lobe is $P_{TOT}'/(T_c/T_{Del})$.

The frequency shift arrangement described above provides for better suppression of the multipath effect because it introduces frequency diversity which changes the phase relationships of the original and time-delayed signals. This reduces or eliminates the cancellation effect shown in FIG. 8d. For a carrier frequency of approximately 1 GHz, the total loss encountered may be less than 3 dB as opposed to 17 dB in the example above (FIG. 8e).

Another feature of the receiver is related to the reception of strong signals above the dynamic range of the receiver signal strength indicator (RSSI). In the case when the signal is very strong and considerably above the noise level, there may be no need to despread the signal before detection. According to FIG. 4, if the spectrum of each component of the spread spectrum signal is narrow enough (in practice, less than 1/Ts) the data can be recovered directly from any of the spectral components without prior despreading. This permits turning off the local PN generator when a predetermined signal strength level has been exceeded for a predetermined period of time thus disabling the acquisition process. Therefore the evaluation of the RSSI signal, which aids the acquisition, is irrelevant. The signal received is so strong that peaks of the spectral lines would be received without despreading. Each spectral lines carries the full modulation; thus allowing the data to be extracted from a single spectral line. This known technique has very practical implications since the RSSI amplifier usually saturates at signal levels which are much smaller than the maximum signal level at which the limiters and the FM discriminator can be expected to function properly. The effective dynamic range of the receiver can be extended in this manner without the necessity for automatic gain control circuitry. In addition, the acquisition time can be reduced for all transmitters which are close enough to the receiver to produce signals at the receiver antenna which are strong enough to actuate this detection mechanism. This type of a narrow band signal spectrum associated with each of the spectral lines can be obtained by using an appropriately chosen deviation together with a bit time Tb much greater than the PN sequence period Ts.

Figures 9A, 9B, 9C, 9D:
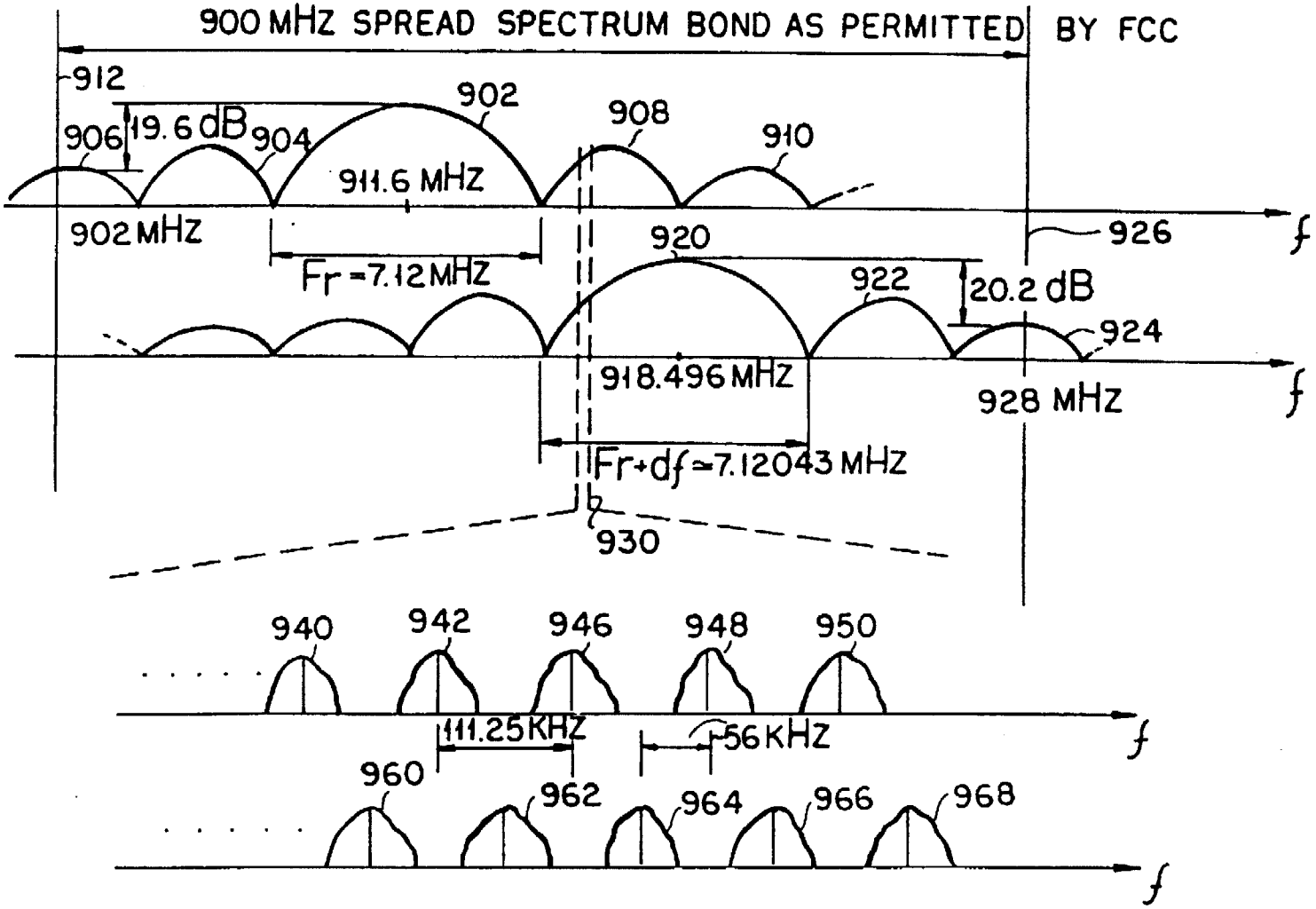
FIGS. 9a–9d show an illustrative example of a system designed to comply with the FCC modulation mask.

The signals generated in a preferred embodiment of the system according to the present invention are shown in FIG. 9. FIGS. 9A and 9B show the spectral envelope of the transmitted signal and its relationship to the Federal Communications Commission (FCC) modulation mask for spread spectrum transmission. The modulation mask allots the frequency band of 902 to 928 MHz and requires that the signal at the boundaries be approximately 20 dB below the level of the transmitted frequencies Ft×1 and Ft×2. In FIG. 9, the following parameters were chosen:

M=128

P=2

L=32

Fr=7.12 MHz and

N=4

These choices result in component spacing of the spread signal of 111.25 kHz and a df of 111.25/(2*129) or approximately 430 Hz. The receiver reference oscillator and the transmitter reference oscillator frequencies are changed from 7.12 (T1) to 7.12043 MHz (T2) or by approximately 60 ppm. The spectra in FIGS. 9a and 9b follow the $(\sin x/x)^2$ rolloff. The lobe 906 at the 902 MHz lower boundary 912 is approximately 19.5 db down from the lobe 902 at frequency Ft×1=911.36 MHz during time T1. The lobe 924 at the 928 MHz upper boundary 926 is approximately 20.2 dB down from the lobe 920 at FxT2=918.44+129*df=918.496 MHz during time T2. Thus minimal filtering is required at the lower boundary and no filtering is required at the upper boundary to meet the FCC modulation mask requirements. This significantly reduces the complexity and cost of the transmitter. This permits the use of non-linear Class C or similar amplifiers in the transmitter which results in reduced power consumption and thus makes the transmitter more suitable for battery operation.

FIGS. 9c and 9d show the close-in spectra within lines 930. As can be seen these spectra are separated by 111.25 KHz. Comparing FIG. 9d to 9c, the spectra of FIG. 9d are offset by approximately ½ chip=56 KHz. A receiver bandwidth (BW) of 50 kHz fulfills the requirement that BW is less than 1/(2Ts) and allows for the reception of the modulated signal at a data rate of 111.25/4 kilobits per second or approximately 27.8 kilobits per second.

While a particular embodiment of the present invention has been disclosed herewithin, certain changes and modifications will readily occur to those skilled in the art. All such changes and modifications can be made without departing from the invention as defined by the appended claims.

We claim:

1. A method of transmitting digital data, comprising the steps of:

a) generating a radio frequency carrier;

b) modulating the frequency of said carrier by data bits assembled in data packets of predetermined format;

c) spreading said carrier during a transmission time, which a predetermined PN sequence having a period Ts related to a bit time Tb
where $$Tb=N*Ts,$$

N being an integer >1 Ts is a pseudo noise (PN) sequence period;

whereby a spread carrier spectrum comprising many spectral components separated by 1/Ts is obtained, the amplitudes of said components being reduced by said spreading function, said components and the modulated imposed upon said component being separable from other components by a narrow band filter having a bandwidth less than 1/(2*Ts).

2. The method according to claim 1, further comprising the steps of:

d) receiving the transmitted data; and e) multiplying said transmitted spread carrier in a receiver by a locally generated predetermined PN sequence, for collapsing the bandwidth of the received spread carrier when the local PN sequence phase in agreement with the sequence phase imposed on the received spread carrier thereby spreading any jamming signals which are received along with the desired transmitted signal into many components separated by 1/Ts intervals and reduced in amplitude by the spreading function.

3. The method according to claim 1, wherein step c) generates spectral components of the spread carrier that are separated by a frequency interval greater than 1/Ts.

4. The method according to claim 1, wherein a chip clock producing a signal at a frequency of [1/Ts] *1/Tc* and the carrier frequency are synchronously derived from one frequency source.

5. The method according to claim 4, wherein the data frequency is synchronously derived from said one frequency source.

6. The method according to claim 1, wherein said predetermined data packet format comprises a preamble period during which said carrier frequency is equal to a nominal frequency and a data period during which the carrier frequency is modulated by said data bits.

7. A transmitter for transmitting digital data comprising:

a) carrier frequency generator means for generating a carrier frequency signal;

b) modulator means for modulating said carrier by data bits;

c) pseudo random sequence generator means for generating a predetermined PN sequence;

d) carrier spread means for spreading power of said carrier frequency by said pseudo noise sequence, said spread carrier generating spectral components separated by a frequency interval greater than 1/Ts where Ts is a pseudo noise (PN) sequence period.

8. The transmitter according to claim 7 wherein Ts is related to the bit time Tb where $$Tb=N*Ts,$$

N being an integer>1.

9. The transmitter according to claim 7 further including a phase lock loop means for deriving said first carrier frequency from a crystal reference oscillator.

10. The transmitter according to claim 7 wherein said transmitter further includes means for deriving chip frequency of [1/Ts] *1/Tc* and said carrier frequency from a single reference frequency source.

11. The transmitter according to claim 7 wherein said transmitter further includes means for deriving chip frequency of [1/Ts] *1/Tc*, said first carrier frequency and a data clock frequency from a single reference frequency source.

12. The transmitter according to claim 7 wherein said transmitter further includes means for generating said formated data packet for modulating said carrier frequency, said data packet comprising a preamble period during which the carrier frequency is equal to a nominal value and data period during which the carrier frequency is deviated according to the corresponding data bit values.

13. A receiver for a spread spectrum signal comprising:

a) a wide band receiving means for receiving a spread carrier radio signal for generating a spread carrier electric signal;

b) means for generating a predetermined PN (pseudo noise) sequence;

c) multiplying means coupled to said receiving means and said generating means for multiplying said spread carrier electrical signal by said predetermined PN sequence, for collapsing a bandwidth of the received spread carrier when the local PN sequence phase is in agreement with the sequence phase imposed on the received spread carrier by a transmitter means, thereby spreading any jamming signals which are received along with the transmitted spread signal into many components separated by 1/Ts intervals and reduced in amplitude by the spreading function;

d) narrow band FM receiver means coupled to an output of said multiplying means for recovering data and having a bandwidth less than 1/(2*Ts) where Ts is at period of said PN sequence.

14. The receiver according to claim 13 wherein each of said receiver means further includes means for deriving a chip frequency of [1/Ts] *1/Tc* and a carrier frequency from a single reference frequency source.

15. The receiver according to claim 14 wherein each of said receiver means further includes means for deriving a chip frequency of [1/Ts] *1/Tc*, a carrier frequency, and a data clock frequency from a single reference frequency source.

16. The receiver according to claim 14 wherein each of said receiver means further includes means for automatic frequency control (AFC) and means for activating said AFC upon synchronization of a phase of said PN sequence with a phase of the PN sequence modulating said receiver signal.

17. The receiver according to claim 13 wherein each of said receiver means further includes signal strength indicator means to detect power of said received signal.

18. A system for transmitting and receiving digital data, comprising:

a) means for generating a radio frequency carrier;

b) means for modulating the frequency of said carrier by data bits assembled in data packets of predetermined format;

c) means for spreading said carrier at said first and said second frequency, during a transmission time, by a predetermined PN sequence having a period Ts related to a bit time Tb where $$Tb=N*Ts,$$

N being an integer>1 Ts is a PN (pseudo noise) sequence period;

whereby a spread carrier spectrum comprising many spectral components separated by 1/Ts is obtained, the amplitudes of said components being reduced by said spreading function;

d) means for receiving the transmitted data; and e) means for multiplying said transmitted spread carrier in said receiver means by a locally generated predetermined PN sequence, for collapsing the bandwidth of the received spread carrier when the local PN sequence phase in agreement with the sequence phase imposed on the received spread carrier;

f) narrow band FM receiver means coupled to an output of said multiplying means for recovering data and having a bandwidth less than 1/(2*Ts).

19. The system according to claim 18, wherein said means for spreading said carrier generates spectral components of the spread carrier that are separated by a frequency interval greater than 1/Ts.

20. The system according to claim 18, wherein a chip clock producing a signal at a frequency of [1/Ts] *1/Tc* and the carrier frequency are synchronously derived from one frequency source.

21. The system according to claim 20, wherein the data frequency is synchronously derived from said one frequency source.

22. The system according to claim 18, wherein K is greater than a sequence length for generating a frequency shift substantially equal to or greater than a [chip] *sequence* frequency of 1/Ts.

23. The system according to claim 18, wherein said predetermined data packet format comprises a preamble period during which said carrier frequency is equal to a nominal frequency and a data period during which the carrier frequency is modulated by said data bits.

* * * * *